United States Patent
Ohiso (10) Patent No.: US 12,085,158 B2
(45) Date of Patent: Sep. 10, 2024

(54) DRIVE DEVICE

(71) Applicant: HONDA MOTOR CO., LTD., Tokyo (JP)

(72) Inventor: Keiichi Ohiso, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/955,674

(22) Filed: Sep. 29, 2022

(65) Prior Publication Data

US 2024/0110616 A1    Apr. 4, 2024

(51) Int. Cl.
| | |
|---|---|
| F16H 48/24 | (2006.01) |
| F16H 48/05 | (2012.01) |
| F16H 48/08 | (2006.01) |
| F16H 48/10 | (2012.01) |

(52) U.S. Cl.
CPC ............ *F16H 48/24* (2013.01); *F16H 48/05* (2013.01); *F16H 2048/085* (2013.01); *F16H 48/10* (2013.01)

(58) Field of Classification Search
CPC .... F16H 48/05; F16H 48/08–2048/087; F16H 48/10–11; F16H 48/20–2048/346
USPC ......................................................... 475/221
See application file for complete search history.

(56) References Cited

U.S. PATENT DOCUMENTS

| | | | | |
|---|---|---|---|---|
| 6,098,737 A | * | 8/2000 | Aoki ...................... | B60K 17/00 903/910 |
| 7,156,766 B2 | * | 1/2007 | Gassmann ............. | B60K 17/16 475/249 |
| 8,414,435 B2 | * | 4/2013 | Yang .................... | F16H 37/0826 475/284 |
| 8,622,867 B1 | * | 1/2014 | Yang ....................... | F16H 48/36 475/221 |

FOREIGN PATENT DOCUMENTS

JP    10-291430    11/1998

* cited by examiner

*Primary Examiner* — Ernesto A Suarez
*Assistant Examiner* — James J Taylor, II
(74) *Attorney, Agent, or Firm* — Amin, Turocy & Watson, LLP (57) ABSTRACT

A drive device capable of suppressing the complication of the device configuration in order to realize a plurality of operation modes is provided.
A drive device includes a drive source, a first differential mechanism, a second differential mechanism, a switching mechanism, and a casing. The differential mechanism includes a first side gear connected to a left wheel, a first case connected to the drive source, and a second side gear. The second differential mechanism includes a third side gear connected to a right wheel, a second case, and a fourth side gear connected to the second side gear. The switching mechanism switches the casing, the first case, the second side gear, and the fourth side gear to a connection state and a non-connection state.

6 Claims, 8 Drawing Sheets

DRIVE DEVICE

BACKGROUND OF THE INVENTION

Field of the Invention

The present disclosure relates to a drive device.

Description of Related Art

In the related art, for example, a coupling device including a pair of differential devices and switching means for switching between a state where starting assist is performed by equally distributing the power of a drive source to right and left wheels of a vehicle and a state where turning assist is performed by generating a differential rotation between the right and left wheels using the power of the drive source has become known (see, for example, Patent Document 1).

[Patent Document 1] Japanese Unexamined Patent Application, First Publication No. Hei 10-291430

SUMMARY OF THE INVENTION

Incidentally, in the above-described coupling device of the related art, for example, it is necessary to provide an additional configuration in a case where a pair of differential devices are switched to a direct connection state like a so-called differential lock, a case where wheels are switched to a fixed-to-ground state like a so-called parking lock, and the like. The above-described coupling device of the related art has a problem that it is not possible to suppress complication of the device configuration in order to realize a plurality of operation modes.

An object of the present disclosure is to provide a drive device capable of suppressing the complication of the device configuration in order to realize a plurality of operation modes.

In order to solve the above-described problem and achieve the object, the present disclosure adopts the following aspects.

(1) A drive device (10, 10A) according to an aspect of the present disclosure includes a drive source (11), a first differential mechanism (15, 15A) including at least a first element (SL) connected to a first wheel (WL) out of two right and left wheels, a second element (CL) connected to the drive source, and a third element (33, 73), a shaft element (Sc) connected to the third element, a second differential mechanism (17, 17A) including at least a fourth element (43, 83) connected to the shaft element (Sc) in common with the third element, a fifth element (CR), and a sixth element (SR) connected to a second wheel (WR) out of the two right and left wheels, and a switching mechanism (19, 19A) switching the shaft element and the fifth element to a connection state and a non-connection state.

(2) In the drive device described in (1) mentioned above, the switching mechanism may switch the second element, the shaft element, and the fifth element to a connection state and a non-connection state.

(3) In the drive device described in (2) mentioned above, the switching mechanism may switch each part (62, 63, 64) in which the second element, the shaft element, and the fifth element are arranged in this order to a connection state and a non-connection state.

(4) The drive device according to (1) mentioned above may further include a support member (C1, C2) supporting the first differential mechanism and the second differential mechanism, in which the switching mechanism may switch the support member and the fifth element to a connection state and a non-connection state.

(5) In the drive device described in (4) mentioned above, the switching mechanism may switch the second element, the shaft element, and the fifth element to a connection state and a non-connection state.

(6) In the drive device described in (4) mentioned above, the switching mechanism may switch the support member, the second element, and the shaft element to a connection state and a non-connection state.

(7) A drive device (10, 10A) according to an aspect of the present disclosure includes a drive source (11), a first differential mechanism (15, 15A) including at least a first element (SL) connected to a first wheel (WL) out of two right and left wheels, a second element (CL) connected to the drive source, and a third element (33, 73), a shaft element (Sc) connected to the third element, a second differential mechanism (17, 17A) including at least a fourth element (43, 83) connected to the shaft element (Sc) in common with the third element, a fifth element (CR), and a sixth element (SR) connected to a second wheel (WR) out of the two right and left wheels, a support member (C1, C2) supporting the first differential mechanism and the second differential mechanism, and a switching mechanism (19, 19A) switching the support member, the second element, and the shaft element to a connection state and a non-connection state.

(8) In the drive device described in (7) mentioned above, the switching mechanism may switch each part (61, 62, 63) in which the support member, the second element, and the shaft element are arranged in this order to a connection state and a non-connection state.

(9) In the drive device described in (8) mentioned above, the switching mechanism may switch the shaft element and the fifth element to a connection state and a non-connection state.

(10) In the drive device described in (8) mentioned above, the switching mechanism may switch the support member and the fifth element to a connection state and a non-connection state.

(11) In the drive device described in (8) mentioned above, the switching mechanism may switch the second element, the shaft element, and the fifth element to a connection state and a non-connection state.

According to (1) described above, a differential operation of a second differential mechanism does not function by the coupling of a shaft element and a fifth element, and the second differential mechanism and a first element (that is, a first wheel and a second wheel) are rotated in the same direction by a differential operation of a first differential mechanism (first mode). By providing the first differential mechanism and the second differential mechanism, it is possible to realize a plurality of operation modes including the first mode while suppressing the complication of the device configuration.

In the case of (2) mentioned above, by connection between the second element, the shaft element, and the fifth element, the first wheel and the second wheel are rotated to be directly connected by prohibiting relative rotations of the first differential mechanism and the second differential mechanism like a so-called differential lock (second mode). On the other hand, the power of the drive source is not transmitted to the first differential mechanism and the second differential mechanism (third mode) due to non-connection between the second element, the shaft element, and the fifth element. It is possible to realize a plurality of operation modes including the first mode, the second mode, and the third mode while suppressing the complication of the device configuration.

In the case of (3) mentioned above, as compared to other arrangements such as a case where the shaft element, the second element, and the fifth element are arranged in this order in each part, it is possible to suppress the complication of a configuration of the switching mechanism required for switching between the first mode and the second mode.

In the case of (4) mentioned above, by connecting the support member and the fifth element, the directions of torques acting on the first element and the sixth element are opposite to each other like a so-called zero turn (fourth mode). It is possible to realize a plurality of operation modes including the first mode and the fourth mode while suppressing the complication of the device configuration.

In the case of (5) mentioned above, by connecting the second element, the shaft element, and the fifth element, the first wheel and the second wheel are rotated to be directly connected by prohibiting relative rotations of the first differential mechanism and the second differential mechanism like a so-called differential lock (second mode). On the other hand, the power of the drive source is not transmitted to the first differential mechanism and the second differential mechanism (third mode) due to non-connection between the second element, the shaft element, and the fifth element. It is possible to realize a plurality of operation modes including the first mode, the second mode, the third mode, and the fourth mode while suppressing the complication of the device configuration.

In the case of (6) mentioned above, by connecting the support member, the second element, and the shaft element, the rotation of the first element is prohibited by fixing the first differential mechanism like a so-called parking lock (fifth mode). It is possible to realize a plurality of operation modes including the first mode, the fourth mode, and the fifth mode while suppressing the complication of the device configuration.

According to (7) mentioned above, by connecting the support member, the second element, and the shaft element, the rotation of the first element is prohibited by fixing the first differential mechanism like a so-called parking lock (fifth mode). By providing the first differential mechanism and the second differential mechanism, it is possible to realize a plurality of operation modes including the fifth mode while suppressing the complication of the device configuration.

In the case of (8) mentioned above, as compared to other arrangements such as a case where the second element, the support member, and the shaft element are arranged in this order in each part, it is possible to suppress the complication of a configuration of the switching mechanism required for switching between the fifth mode and other modes.

In the case of (9) mentioned above, a differential operation of the second differential mechanism does not function by the coupling of the shaft element and the fifth element, and the second differential mechanism and the first element (that is, the first wheel and the second wheel) are rotated in the same direction by a differential operation of the first differential mechanism (first mode). It is possible to realize a plurality of operation modes including the first mode and the fifth mode while suppressing the complication of the device configuration.

In the case of (10) mentioned above, by connecting the support member and the fifth element, the directions of torques acting on the first element and the sixth element are opposite to each other like turning including a so-called zero turn (fourth mode). It is possible to realize a plurality of operation modes including the fourth mode and the fifth mode while suppressing the complication of the device configuration.

In the case of (11) mentioned above, by connection between the second element, the shaft element, and the fifth element, the first wheel and the second wheel are rotated to be directly connected by prohibiting relative rotations of the first differential mechanism and the second differential mechanism like a so-called differential lock (second mode). On the other hand, the power of the drive source is not transmitted to the first differential mechanism and the second differential mechanism (third mode) due to non-connection between the second element, the shaft element, and the fifth element. It is possible to realize a plurality of operation modes including the second mode, the third mode, and the fifth mode while suppressing the complication of the device configuration.

DETAILED DESCRIPTION OF THE INVENTION

A drive device according to an embodiment of the present disclosure will be described below with reference to the accompanying drawings.

Figure 1:
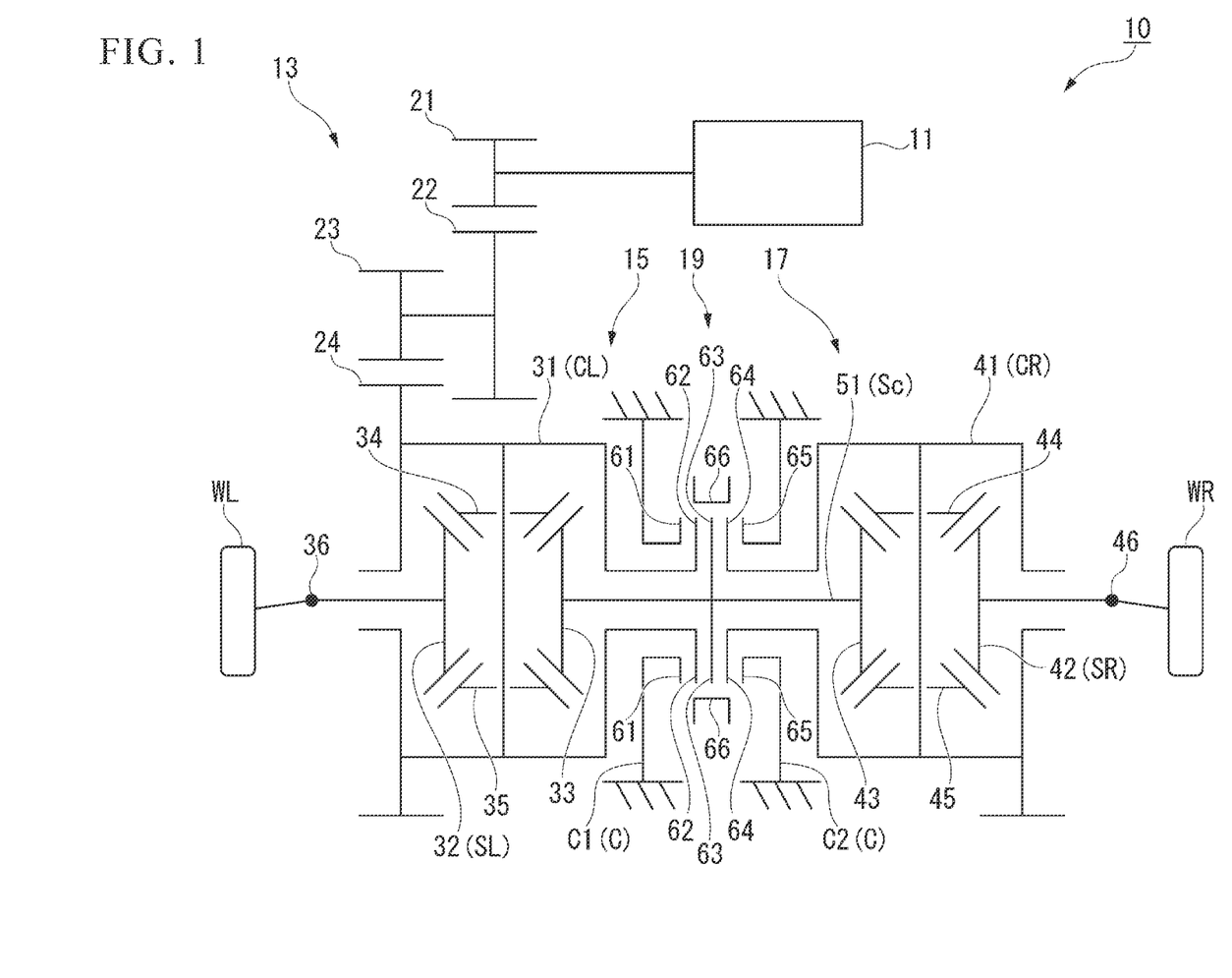
FIG. 1 is a conceptual diagram illustrating a configuration of a drive device according to an embodiment of the present disclosure.

FIG. 1 is a conceptual diagram illustrating a configuration of a drive device 10 of the embodiment.

The drive device 10 of the embodiment is, for example, a drive device that connects and drives right and left wheels WR and WL of a vehicle or a moving body such as a lawnmower and a carrier.

As illustrated in FIG. 1, the drive device 10 includes, for example, a drive source 11, a power transmission mechanism 13, a first differential mechanism 15, a second differential mechanism 17, a switching mechanism 19, and a casing C.

The drive source 11 is, for example, a rotating electric machine. The drive source 11 is connected to the power transmission mechanism 13.

The power transmission mechanism 13 transmits, for example, power between the drive source 11 and the first differential mechanism 15. The power transmission mechanism 13 includes, for example, a plurality of gears. The plurality of gears include, for example, a first gear 21, a second gear 22, a third gear 23, and a fourth gear 24 which sequentially engage with each other. Each of the gears 21, 22, 23, and 24 is, for example, a spur gear with external teeth whose tooth trace is parallel to the central axis.

The first gear 21 is fixed to the rotating shaft of the drive source 11. The central axis of the first gear 21 and the rotating shaft of the drive source 11 are coaxial with each other.

The second gear 22 and the third gear 23 are integrally fixed with their central axes coaxial. The second gear 22 engages with the first gear 21. The third gear 23 engages with the fourth gear 24.

The fourth gear 24 is, for example, a ring gear with external teeth. The fourth gear 24 is fixed to an outer peripheral portion of a first case 31 to be described below of the first differential mechanism 15. The central axis of the fourth gear 24 and the central axis of the first case 31 are coaxial with each other.

The first differential mechanism 15 is connected to, for example, the left wheel WL. The second differential mechanism 17 is connected to, for example, the right wheel WR. The first differential mechanism 15 and the second differential mechanism 17 have, for example, the same configuration. For example, the first differential mechanism 15 and the second differential mechanism 17 are disposed symmetrically bilaterally with their central axes coaxial. The first differential mechanism 15 and the second differential mechanism 17 are, for example, bevel gear type differential mechanisms and are open differentials that do not have a so-called differential limiting mechanism.

The first differential mechanism 15 includes, for example, the first case 31, a first side gear 32, a second side gear 33, a first pinion 34, a second pinion 35, and a first constant velocity joint 36.

The outer shape of the first case (CL) 31 is, for example, a cylindrical shape. The first case 31 accommodates, for example, the side gears 32 and 33 and the pinions 34 and 35 therein. As described above, the first case 31 is fixed to, for example, an inner peripheral portion of the fourth gear 24 of the power transmission mechanism 13. The central axis of the first case 31 is coaxial with the central axis of the fourth gear 24.

The first case 31 rotatably supports the pinions 34 and 35. For example, the first case 31 includes a peripheral wall portion that supports the pinions 34 and 35. The central axis of the first case 31 is orthogonal to the central axes of the pinions 34 and 35. The rotation of the pinions 34 and 35 is the rotation centering on the central axes of the pinions 34 and 35.

The first side gear (SL) 32 and the second side gear 33 are, for example, the same bevel gears. The central axes of the side gears 32 and 33 are coaxial with the central axis of the first case 31. The first side gear 32 and the second side gear 33 are disposed symmetrically along their central axes. The side gears 32 and 33 engage with the first pinion 34 and the second pinion 35, respectively. The first side gear 32 is connected to, for example, the first constant velocity joint 36.

The first pinion 34 and the second pinion 35 are, for example, the same bevel gears. The central axes of the pinions 34 and 35 are orthogonal to the central axis of the first case 31. The first pinion 34 and the second pinion 35 are disposed, for example, symmetrically along their central axes. The pinions 34 and 35 engage with the first side gear 32 and the second side gear 33, respectively. The pinions 34 and 35 rotate about their central axes as the center of rotation while being supported by the first case 31.

The first constant velocity joint 36 is connected to the axle of the left wheel WL and the rotating shaft of the first side gear 32.

The second differential mechanism 17 includes, for example, a second case 41, a third side gear 42, a fourth side gear 43, a third pinion 44, a fourth pinion 45, and a second constant velocity joint 46.

The outer shape of the second case (CR) 41 is, for example, a cylindrical shape. The central axis of the second case 41 is coaxial with the central axis of the first case 31. The second case 41 accommodates, for example, the side gears 42 and 43 and the pinions 44 and 45 therein. The second case 41 rotatably supports the pinions 44 and 45. For example, the second case 41 includes a peripheral wall portion that support the pinions 44 and 45. The central axis of the second case 41 is orthogonal to the central axes of the pinions 44 and 45. The rotation of the pinions 44 and 45 is about their central axes as the center of rotation.

The third side gear (SR) 42 and the fourth side gear 43 are, for example, the same bevel gears. The central axes of the side gears 42 and 43 are coaxial with the central axis of the second case 41. The third side gear 42 and the fourth side gear 43 are disposed symmetrically along their central axes. The side gears 42 and 43 engage with the third pinion 44 and the fourth pinion 45. The third side gear 42 is connected to, for example, the second constant velocity joint 46.

The third pinion 44 and the fourth pinion 45 are, for example, the same bevel gears. The central axes of the pinions 44 and 45 are orthogonal to the central axis of the second case 41. The third pinion 44 and the fourth pinion 45 are disposed, for example, symmetrically along their central axes. The pinions 44 and 45 engage with the third side gear 42 and the fourth side gear 43. The pinions 44 and 45 rotate about their central axes as the center of rotation while being supported by the second case 41.

The second constant velocity joint 46 is connected to the axle of the right wheel WR and the rotating shaft of the third side gear 42.

The first differential mechanism 15 and the second differential mechanism 17 are provided with a center shaft member (Sc) 51 that connects the second side gear 33 and the fourth side gear 43 on the inner side in the axial direction. The central axis of the center shaft member 51 is coaxial with the central axes of the first differential mechanism and the second differential mechanism 17 (that is, the central axes of the second side gear 33 and the fourth side gear 43).

The switching mechanism 19 includes, for example, a pair of first fixation dogs 61, a pair of second fixation dogs 62, a pair of third fixation dogs 63, a pair of fourth fixation dogs 64, a pair of fifth fixation dogs 65, and a pair of movable dogs 66.

The switching mechanism 19 switches between selective connection and non-connection of a plurality of elements by fitting and cancelling of fitting between the fixation dogs 61, 62, 63, 64, and 65 and the movable dogs 66, for example, like a so-called dog clutch. The plurality of elements are set corresponding to a plurality of operation modes to be described below and are predetermined combinations of the casing C, the first case 31, the second case 41, and the center shaft member 51.

The first fixation dog 61 is provided integrally with the casing C to be described below. The second fixation dog 62 is provided integrally with the first case 31. The third fixation dog 63 is provided integrally with the center shaft member 51. The fourth fixation dog 64 is provided integrally with the second case 41. The fifth fixation dog 65 is provided integrally with the casing C to be described below.

For example, the fixation dogs 61, 62, 63, 64, and 65 are arranged in the order of the first fixation dog 61, the second fixation dog 62, the third fixation dog 63, the fourth fixation dog 64, and the fifth fixation dog 65. The fixation dogs 61, 62, 63, 64, and 65 are arranged, for example, in a direction parallel to the central axes of the first differential mechanism 15 and the second differential mechanism 17. The fixation dogs 61, 62, 63, 64, and 65 are formed to have, for example, an annular shape.

The movable dog 66 is formed to have, for example, an annular shape. The movable dog 66 is disposed, for example, on the outer diameter sides of the annular fixation dogs 61, 62, 63, 64, and 65. For example, the central axes of the annular fixation dogs 61, 62, 63, 64, and 65 and the central axes of the annular movable dogs 66 are coaxial with each other. The movable dogs 66 move in the arrangement direction of the fixation dogs 61, 62, 63, 64, and 65, for example, by an operator's operation through an appropriate operation member or power of an appropriate actuator.

For example, a spline formed by a combination of convex portions and concave portions that are detachable so as to fit each other is formed in the fixation dogs 61, 62, 63, 64, and 65 and the movable dogs 66. For example, the spline is formed in each of the outer peripheral portions of the fixation dogs 61, 62, 63, 64, and 65 and each of the inner peripheral portions of the movable dogs 66. For example, the splines on the outer peripheral portions of the fixation dogs 61, 62, 63, 64, and 65 are so-called external tooth splines. For example, the splines on the inner peripheral portions of the movable dogs 66 are so-called internal tooth splines.

For example, the movable dogs 66 are fitted to a predetermined combination of the fixation dogs 61, 62, 63, 64, and 65 by relatively moving in the arrangement direction of the fixation dogs 61, 62, 63, 64, and 65. The movable dogs 66 integrally connects a predetermined combination of a plurality of elements corresponding to the fixation dogs 61, 62, 63, 64, and 65 fitted to the movable dogs 66.

The casing C supports the first differential mechanism 15 and the second differential mechanism 17. The casing C includes, for example, a first casing C1 provided with the first fixation dog 61 and a second casing C2 provided with the fifth fixation dog 65. The first casing C1 and the second casing C2 are integrally formed and disposed to sandwich the second fixation dog 62, the third fixation dog 63, and the fourth fixation dog 64 by the first fixation dog 61 and the fifth fixation dog 65 from both sides in the arrangement direction.

Operation Mode

Hereinafter, operation modes of the drive device 10 of the embodiment will be described.

Figure 2:
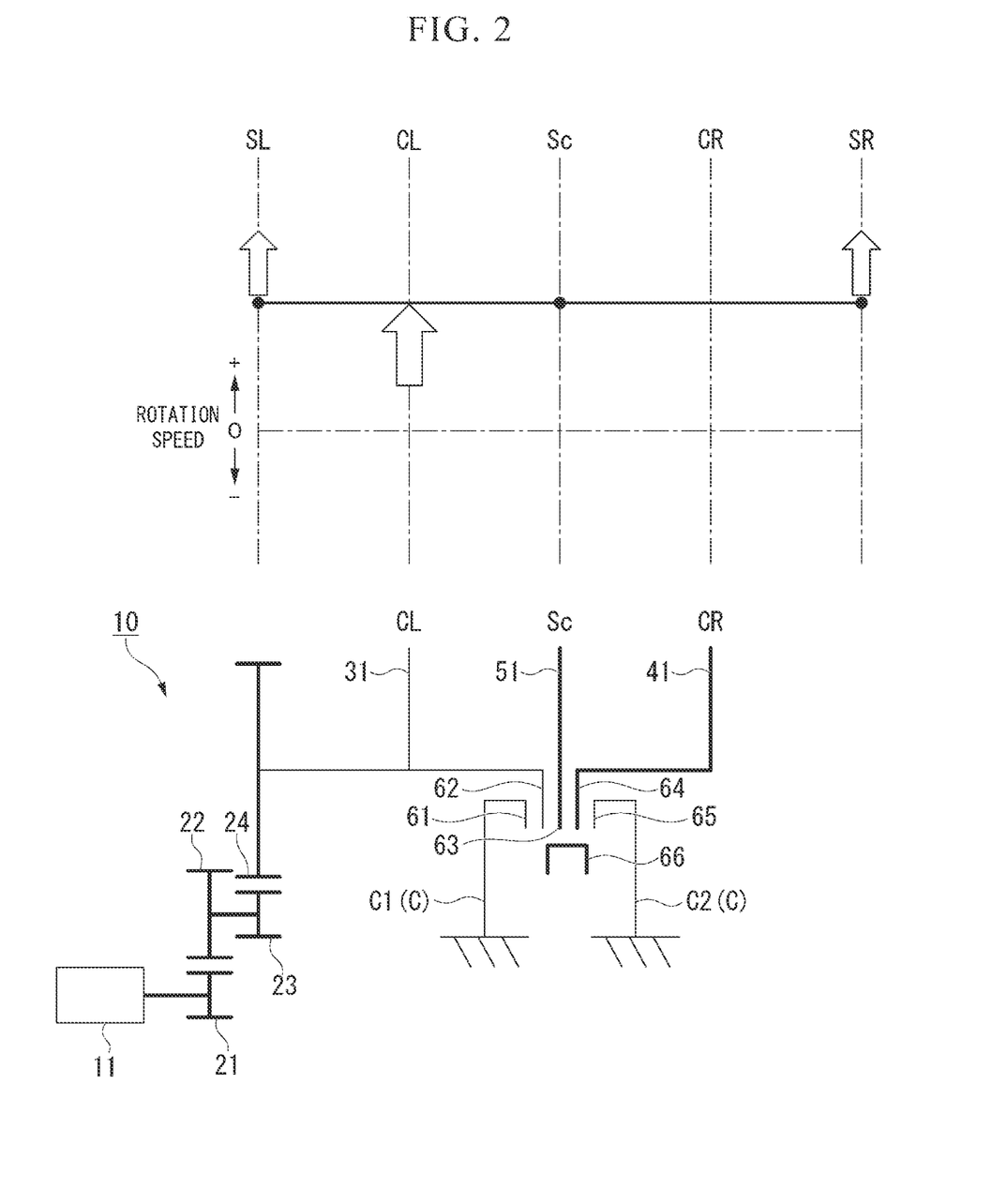
FIG. 2 is a speed diagram illustrating an example of the rotation state of each element in a first mode of the drive device according to the embodiment of the present disclosure and is a diagram schematically illustrating the state of power transmission.

FIG. 2 is a speed diagram illustrating an example of the rotation state of each element in a first mode of the drive device 10 according to the embodiment, and is a diagram schematically illustrating the state of power transmission.

Note that, in respective speed diagrams of FIGS. 2, 3, 4, 5, 6, and 7 to be described below, arrows directing a common line indicate inputs, and arrows receding from the common line indicates outputs.

As illustrated in FIG. 2, in a first mode of the drive device 10, the movable dogs 66 of the switching mechanism 19 are sequentially fitted with the third fixation dog 63 and fourth fixation dog 64 adjacent to each other. In the first mode, the switching mechanism 19 directly connects the right wheel WR and the second side gear 33 by integrally connecting the center shaft member (Sc) 51 and the second case (CR) 41.

In the first mode, the second differential mechanism 17 and the first side gear (SL) 32 (that is, the right wheel WR and the left wheel WL) are rotated in the same direction by a differential operation of the first differential mechanism 15 without performing a differential operation of the second differential mechanism 17. In the first mode, the directions of drive forces acting on the first side gear (SL) 32, the first case (CL) 31, and the third side gear (SR) 42 are the same directions, and the vehicle or the like is moving forward or backward.

The speed diagram illustrated in FIG. 2 illustrates, for example, a state where the rotation speeds of the first side gear (SL) 32, the first case (CL) 31, and the third side gear (SR) 42 are higher than zero by the first case (CL) 31 rotating forward with the power of the drive source 11, and the vehicle or the like is moving forward. In this case, the rotation speeds of the first side gear (SL) 32 and the third side gear (SR) 42 are the same by the power of the drive source 11 being transmitted to be equally distributed to the first side gear (SL) 32 and the third side gear (SR) 42.

Further, in the first mode, in a state where the vehicle or the like is turning while moving forward or backward by a differential operation of the first differential mechanism 15, the common lines in the speed diagrams are inclined obliquely so as to absorb a difference in the number of rotations of the right and left wheels WR and WL.

Figure 3:
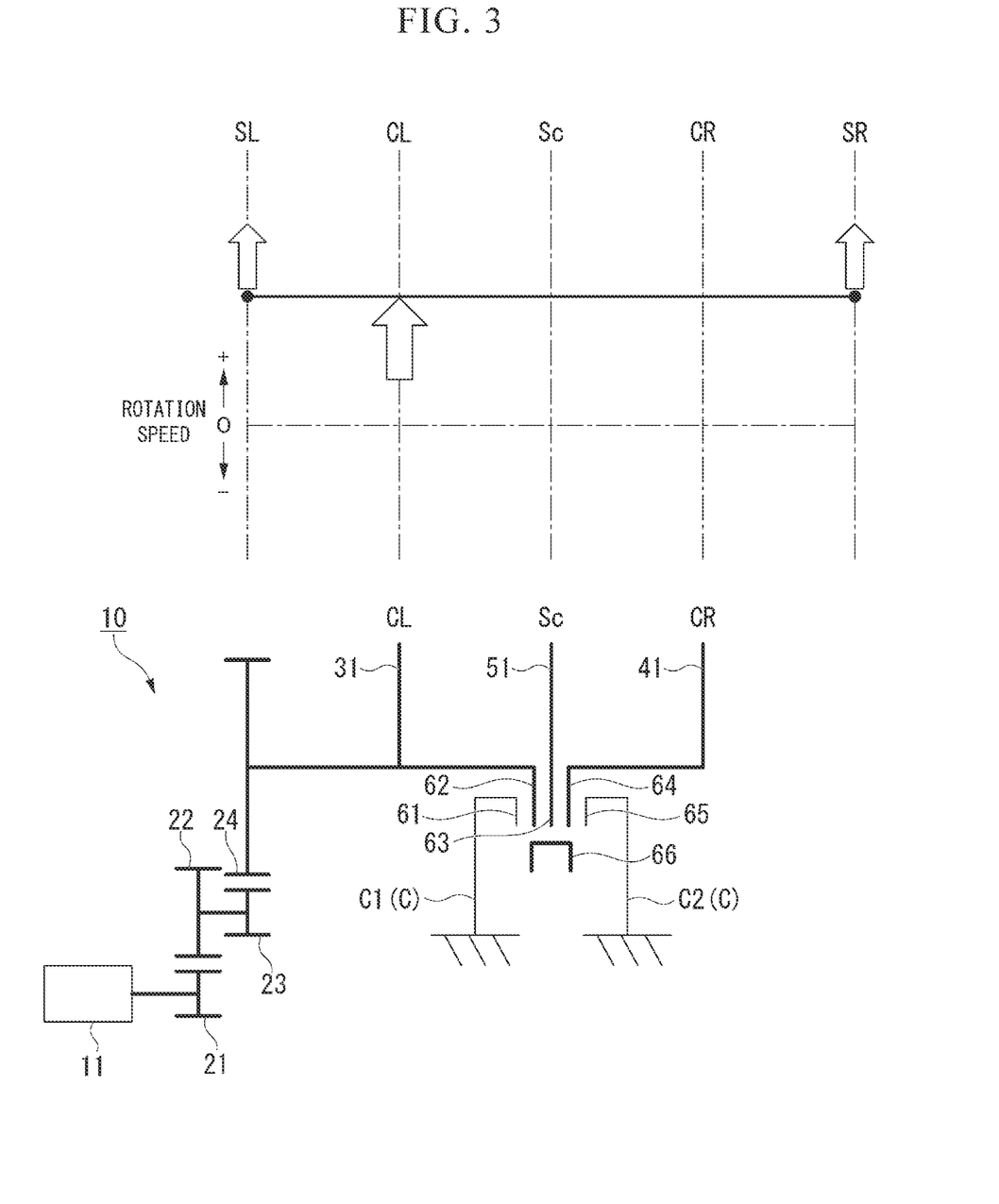
FIG. 3 is a speed diagram illustrating an example of the rotation state of each element in a second mode of the drive device according to the embodiment of the present disclosure and is a diagram schematically illustrating the state of power transmission.

FIG. 3 is a speed diagram illustrating an example of the rotation state of each element in a second mode of the drive device 10 according to the embodiment and schematically illustrating the state of power transmission.

As illustrated in FIG. 3, in the second mode of the drive device 10, the movable dogs 66 of the switching mechanism 19 are sequentially fitted to the second fixation dog 62, the third fixation dog 63, and the fourth fixation dog 64 that are adjacent to each other. In the second mode, the switching mechanism 19 directly connects the right and left wheels WR and WL by integrally connecting the first case (CL) 31, the center shaft member (Sc) 51, and the second case (CR) 41.

In the second mode, the relative rotations of the right and left wheels WR and WL is prohibited by prohibiting the differential operations of the first differential mechanism 15 and the second differential mechanism 17. In the second mode, drive forces acting on the first side gear (SL) 32 and the third side gear (SR) 42 is the same, and the vehicle or the like is in a so-called differential lock state.

The speed diagram illustrated in FIG. 3 illustrates, for example, a state where the rotation speeds of the first side gear (SL) 32, the first case (CL) 31, and the third side gear (SR) 42 are the same rotation speeds higher than zero by the first case (CL) 31 rotating forward with the power of the drive source 11, and the vehicle or the like is moving forward.

In the speed diagram in the second mode, the rotation speeds of the first side gear (SL) 32 and the third side gear (SR) 42 are the same as in the speed diagram in the first mode in which the vehicle or the like is moving straight. In the case of the second mode, there is no difference in the number of rotations of the right and left wheels WR and WL due to differential operations as in the first mode by the directly connection state of the right and left wheels WR and WL. For example, even when any one of the right and left wheels WR and WL runs idle, the vehicle or the like moves by the other wheel that transmits a driving force to a running road or the like.

Figure 4:
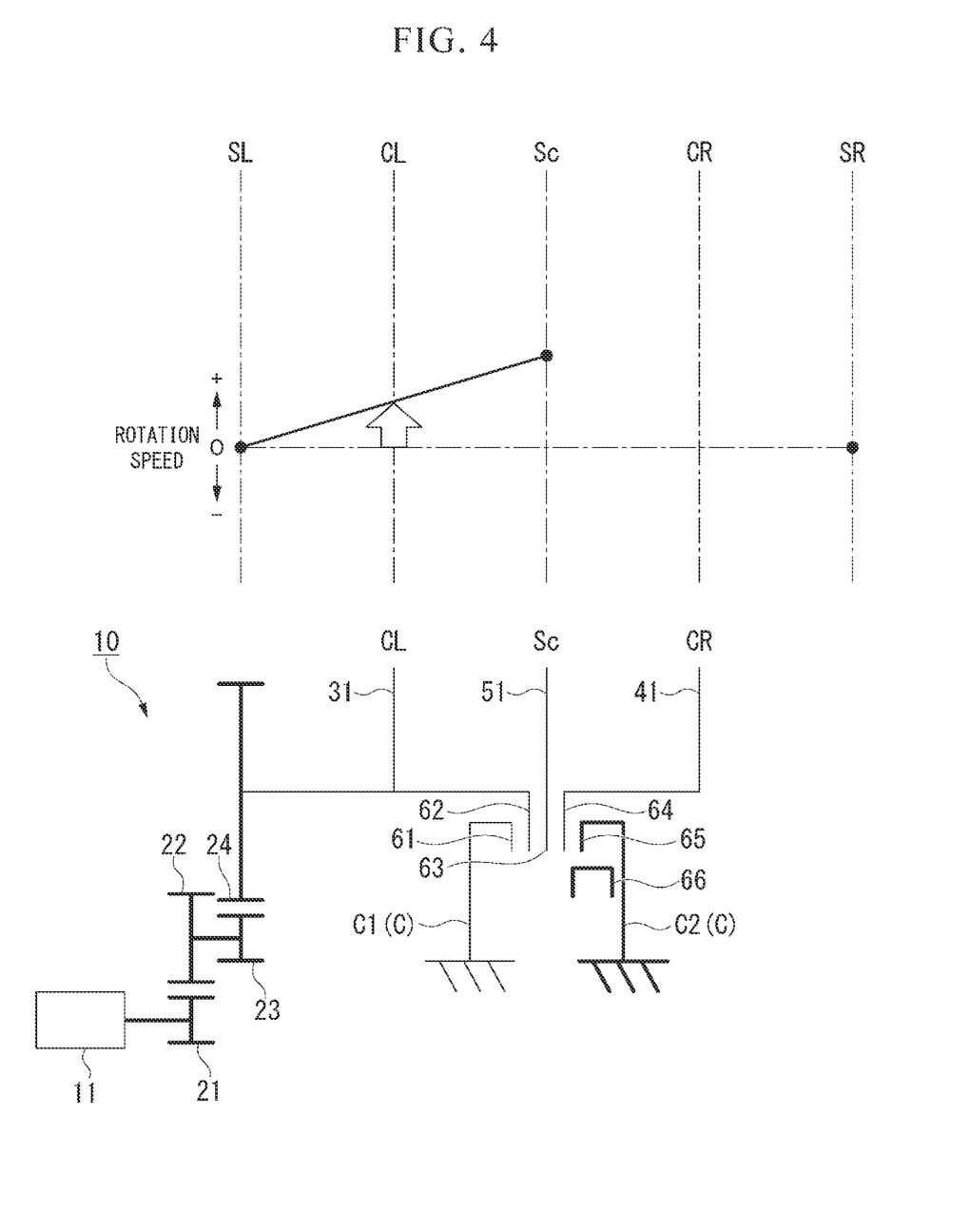
FIG. 4 is a speed diagram illustrating an example of the rotation state of each element in a third mode of the drive device according to the embodiment of the present disclosure and is a diagram schematically illustrating an example of the state of power transmission.
Figure 5:
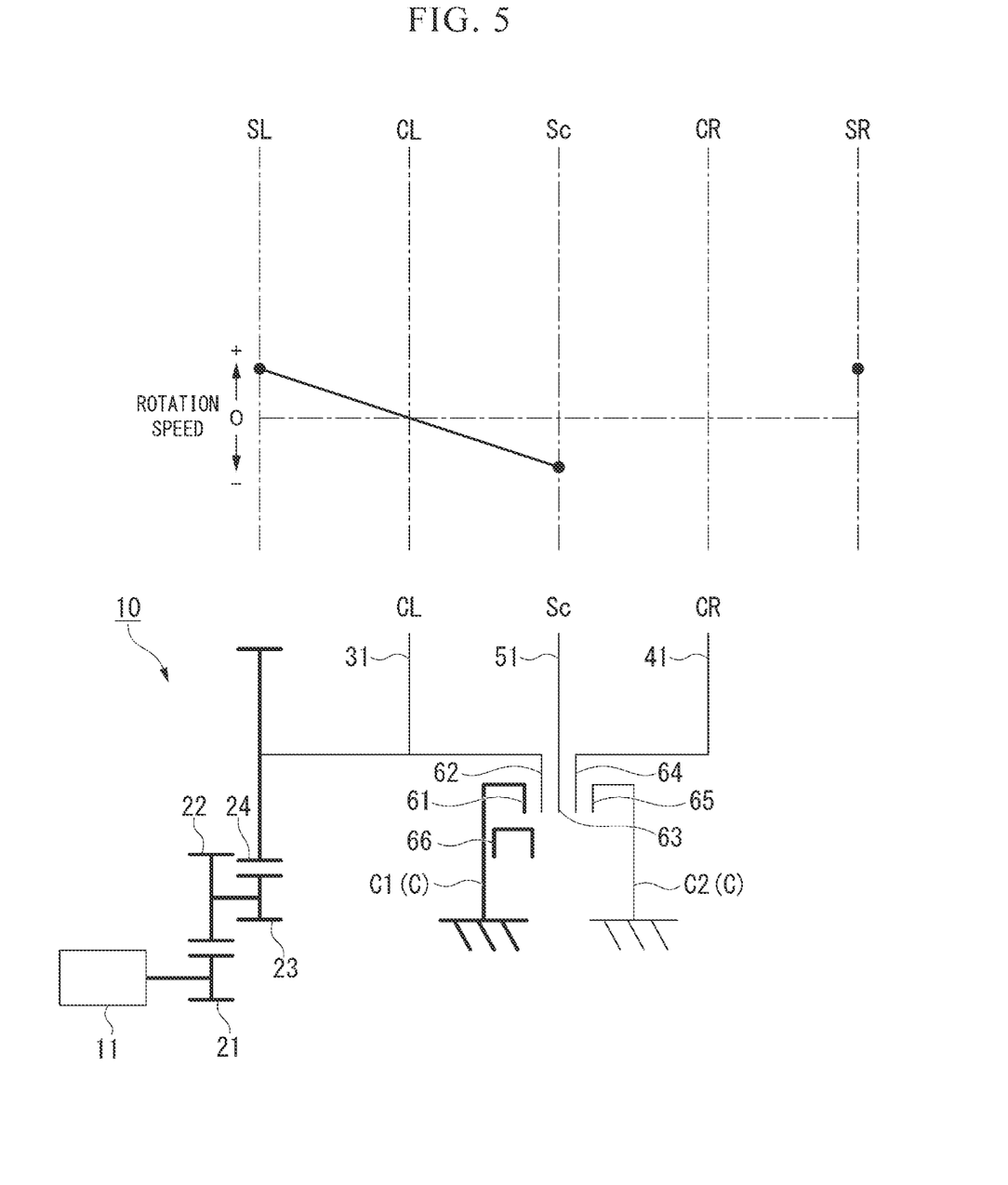
FIG. 5 is a speed diagram illustrating another example of the rotation state of each element in the third mode of the drive device according to the embodiment of the present disclosure and is a diagram schematically illustrating another example of the state of power transmission.

FIG. 4 is a speed diagram illustrating an example of the rotation state of each element in a third mode of the drive device 10 according to the embodiment and is a diagram schematically illustrating an example of the state of power transmission. FIG. is a speed diagram illustrating another example of the rotation state of each element in the third mode of the drive device 10 according to the embodiment and is a diagram schematically illustrating another example of the state of power transmission.

As illustrated in FIGS. 4 and 5, in the third mode of the drive device 10, the movable dogs 66 of the switching mechanism 19 are fitted to only the first fixation dog 61 or the fifth fixation dog 65 or are fitted to neither one of the fixation dogs 61, 62, 63, 64, and 65. In the third mode, the switching mechanism 19 sets any combination of the casing C, the first case (CL) 31, the center shaft member (Sc) 51, and the second case (CR) 41 to be in a non-connection state.

In the third mode, the power of the drive source 11 is not transmitted to the first side gear (SL) 32 and third side gear (SR) 42 by the pinions 34 and 35 running idle in the first differential mechanism 15 and the pinions 44 and 45 running idle in the second differential mechanism 17. In the third mode, the drive source 11 is disconnected from the right and left wheels WR and WL.

Note that, in the third mode, the second case (CR) 41, the center shaft member (Sc) 51, the second side gear 33, the fourth side gear 43, and the third fixation dog 63 are also running idle.

The speed diagram illustrated in FIG. 4, for example, even when the rotation speed of the center shaft member (Sc) 51 becomes higher than zero due to the forward rotation of the first case (CL) 31 with the power of the drive source 11, power is not transmitted to the first side gear (SL) 32 and the third side gear (SR) 42, and the vehicle or the like remains stopped.

For example, the speed diagram illustrated in FIG. 5 illustrates a state where the rotation of the right and left wheels WR and WL is not transmitted to the drive source 11 due to the disconnection between the drive source 11 and the right and left wheels WR and WL, and the right and left wheels WR and WL are moving while rotating due to an external force such as a force of pushing the vehicle or the like by an operator. In this case, the magnitude of an external force required to move the vehicle or the like (that is, in order to rotate the right and left wheels WR and WL) becomes smaller than that in a case where the drive source 11 and the right and left wheels WR and WL are not disconnected from each other.

Figure 6:
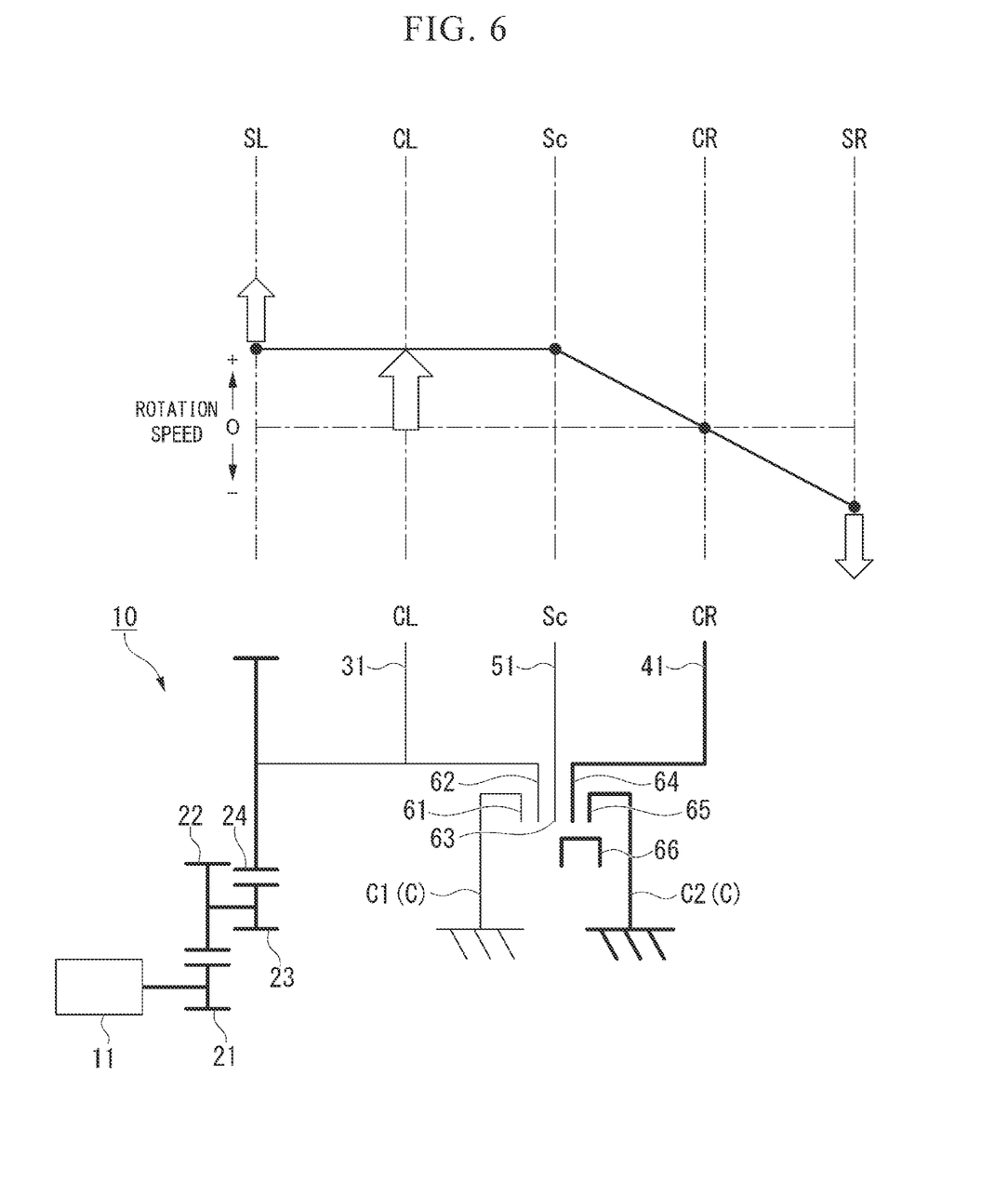
FIG. 6 is a speed diagram illustrating an example of the rotation state of each element in a fourth mode of the drive device according to the embodiment of the present disclosure and is a diagram schematically illustrating the state of power transmission.

FIG. 6 is a speed diagram illustrating an example of the rotation state of each element in a fourth mode of the drive device 10 according to the embodiment, and is a diagram schematically illustrating the state of power transmission.

As illustrated in FIG. 6, in the fourth mode of the drive device 10, the movable dogs 66 of the switching mechanism 19 are sequentially fitted to the fourth fixation dog 64 and the fifth fixation dog 65 that are adjacent to each other. In the second mode, the switching mechanism 19 sets the second case (CR) 41 to be in a fixed state by integrally connecting the second case (CR) 41 and the second casing C2.

In the fourth mode, the rotations of the third side gear (SR) 42 and the fourth side gear 43 are reversed in the second differential mechanism 17, and thus the directions of torques acting on the first side gear (SL) 32 and the third side gear (SR) 42 are opposite to each other. In the fourth mode, the direction of a driving force acting on the first side gear (SL) 32 and the first case (CL) 31 and the direction of a driving force acting on the third side gear (SR) 42 are opposite to each other, and the vehicle or the like is in a turning state including a so-called zero turn.

For example, the speed diagram illustrated in FIG. 6 illustrates a state where a positive torque and a negative torque respectively act on the first side gear (SL) 32 and the third side gear (SR) 42 due to the forward rotation of the first case (CL) 31 with the power of the drive source 11, and the vehicle or the like turns right by a so-called zero turn. In this case, the rotation of the center shaft member (Sc) 51 and the third side gear (SR) 42 are reversed, and thus the forward rotation of the center shaft member (Sc) 51 is converted into the reverse rotation of the third side gear (SR) 42 by the second differential mechanism 17. The left wheel WL is rotating forward (rotation in a forward direction), and the right wheel WR is rotating reversely (rotation in a backward direction), and thus the vehicle or the like turns right in a zero turn state.

Figure 7:
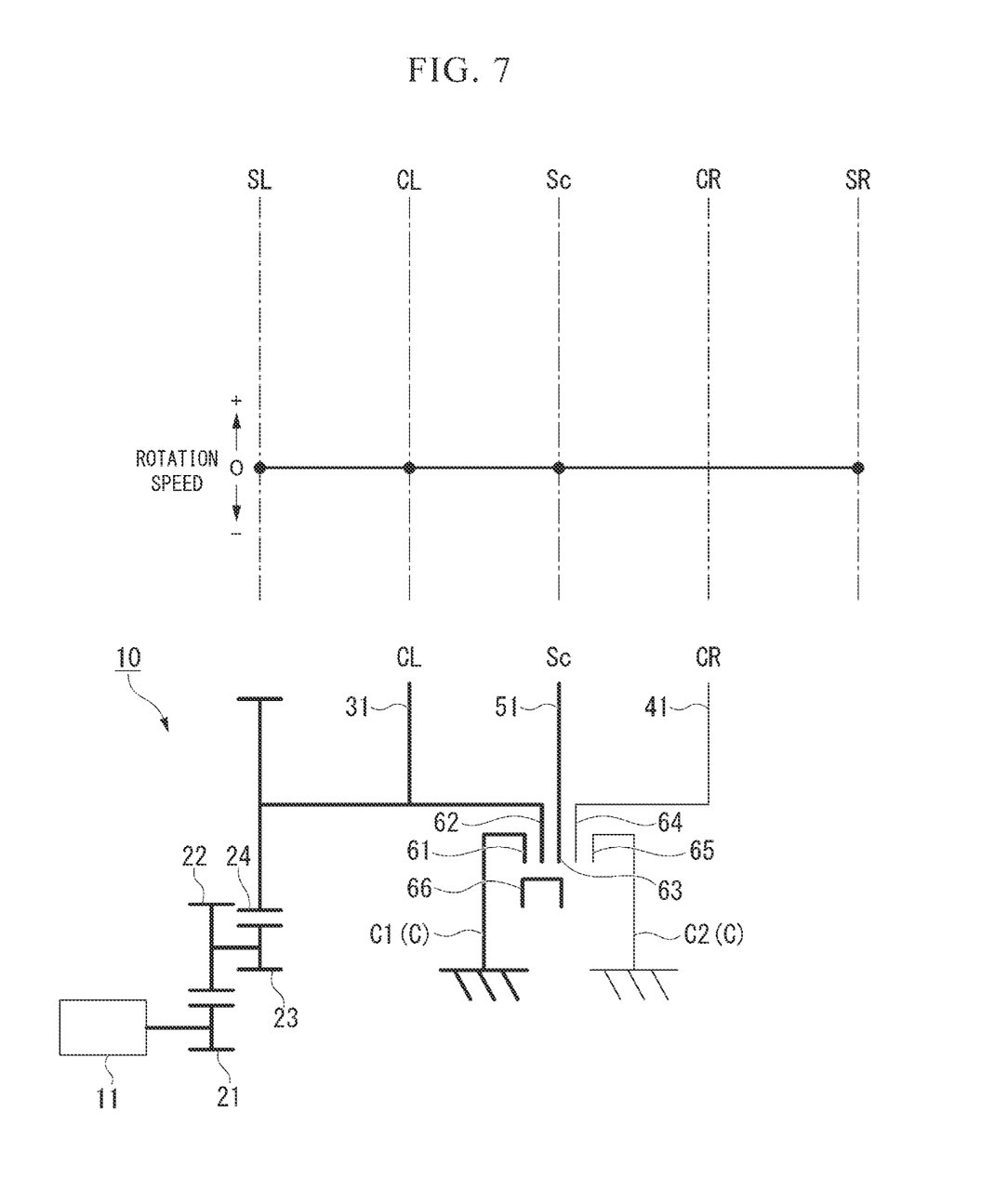
FIG. 7 is a speed diagram illustrating an example of the rotation state of each element in a fifth mode of the drive device according to the embodiment of the present disclosure and is a diagram schematically illustrating the state of power transmission.

FIG. 7 is a speed diagram illustrating an example of the rotation state of each element in a fifth mode of the drive device 10 according to the embodiment and is a diagram schematically illustrating the state of power transmission.

As illustrated in FIG. 7, in the fifth mode of the drive device 10, the movable dogs 66 of the switching mechanism 19 are sequentially fitted to the first fixation dog 61, the second fixation dog 62, and the third fixation dog 63 that are adjacent to each other. In the fifth mode, the switching mechanism 19 sets the left wheel WL to be in a fixed state by integrally connecting the first casing C1, the first case (CL) 31, and the center shaft member (Sc) 51.

The fifth mode is a state where the rotation of the left wheel WL is prohibited by fixing the first differential mechanism 15, which is a so-called parking lock state of the vehicle or the like.

The speed diagram illustrated in FIG. 7 illustrates, for example, a state where the rotation speeds of the first side gear (SL) 32, the first case (CL) 31, the center shaft member (Sc) 51, and the third side gear (SR) 42 are set to zero, and the vehicle or the like is stopped.

As described above, the drive device 10 of the embodiment includes the first differential mechanism 15, the second differential mechanism 17, the switching mechanism 19, and the casing C, and thus it is possible to realize a plurality of operation modes including the first mode, the second mode, the third mode, the fourth mode, and the fifth mode while suppressing the complication of the device configuration.

The fixation dogs 61, 62, 63, 64, and 65 of the switching mechanism 19 are arranged in the order of the first fixation dog 61, the second fixation dog 62, the third fixation dog 63, the fourth fixation dog 64, and the fifth fixation dog 65, and thus it is possible to suppress the complication of a configuration required for switching between a plurality of operation modes.

Compared to other arrangements in which, for example, the fixation dogs 62, 63, and 64 are arranged in the order of the third fixation dog 63, the second fixation dog 62, and the fourth fixation dog 64, it is possible to suppress the complication of the configuration of the switching mechanism 19 required for switching between the first mode and the second mode.

Compared to other arrangements in which, for example, the fixation dogs 61, 62, and 63 are arranged in the order of the second fixation dog 62, the first fixation dog 61, and the third fixation dog 63, it is possible to suppress the complication of the configuration of the switching mechanism 19 required for switching between the fifth mode and another mode.

Modification Example

Hereinafter, a modification example of the embodiment will be described. Note that the same portions as those in the above-described embodiment are denoted by the same reference numerals and signs, and description thereof will be omitted or simplified.

Although the first differential mechanism 15 and the second differential mechanism 17 are assumed to be bevel gear type differential mechanisms in the above-described embodiment, the present disclosure is not limited thereto, and they may be planetary gear type differential mechanisms.

Figure 8:
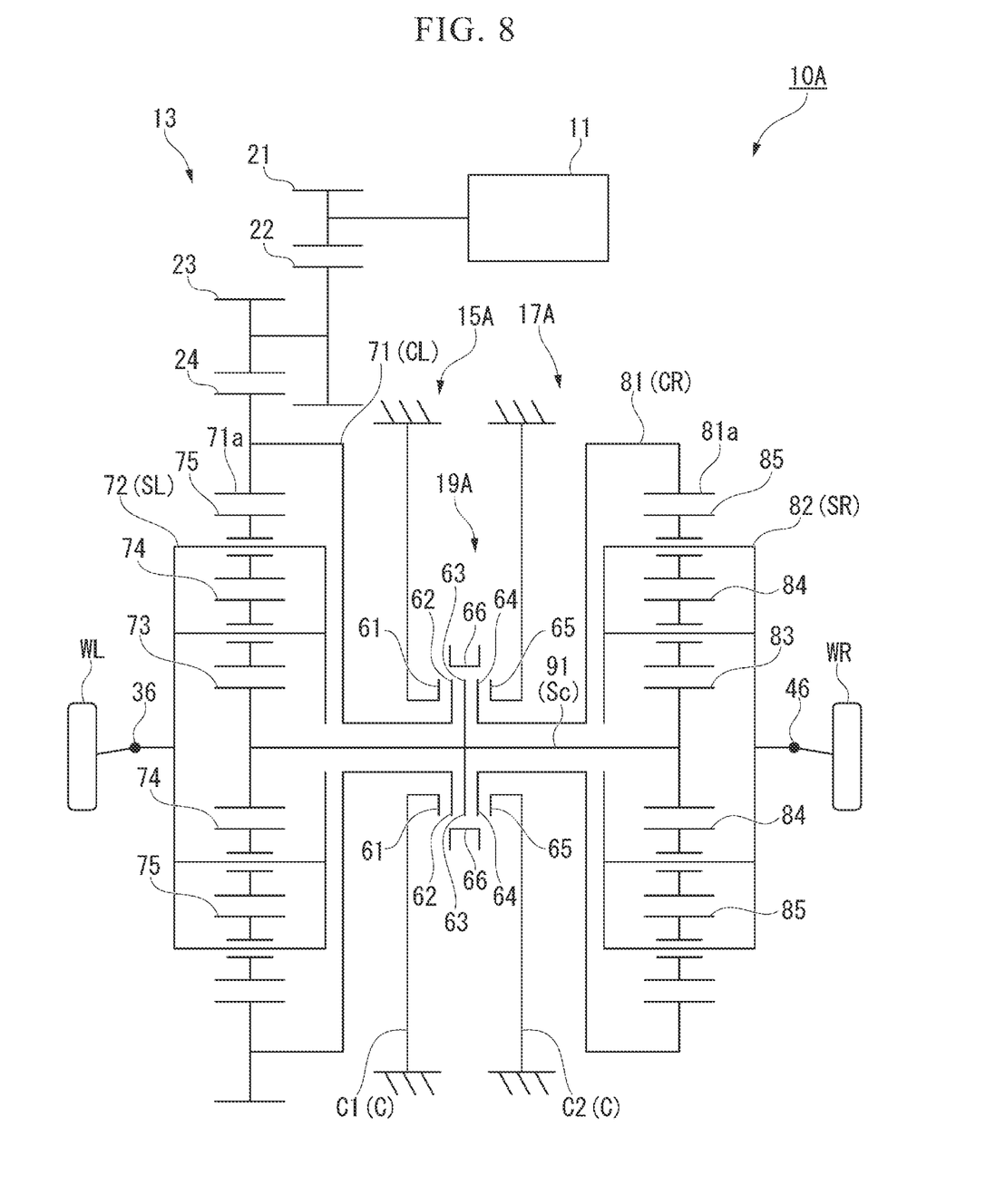
FIG. 8 is a conceptual diagram illustrating a configuration of a drive device according to a modification example of the embodiment of the present disclosure.

FIG. 8 is a conceptual diagram illustrating a configuration of a drive device 10A according to the modification example of the embodiment.

As illustrated in FIG. 8, the drive device 10A according to the modification example includes, for example, a drive source 11, a power transmission mechanism 13, a first differential mechanism 15A, a second differential mechanism 17A, a switching mechanism 19A, and a casing C.

A fourth gear 24 of the power transmission mechanism 13 according to the modification example is fixed to the outer peripheral portion of a first ring gear 71 to be described below of the first differential mechanism 15A according to the modification example. The central axis of the fourth gear 24 is coaxial with the central axis of the first ring gear 71.

The first differential mechanism 15A according to the modification example is connected to, for example, a left wheel WL. The second differential mechanism 17A according to the modification example is connected to, for example, a right wheel WR. The first differential mechanism 15A and the second differential mechanism 17A according to the modification example include, for example, the same configuration. The first differential mechanism 15A and the second differential mechanism 17A according to the modification example are disposed symmetrically bilaterally with their central axes coaxial. The first differential mechanism 15A and the second differential mechanism 17A according to the modification example are, for example, planetary gear type differential mechanisms.

The first differential mechanism 15A according to the modification example includes, for example, a first ring gear 71, a first carrier 72, a first sun gear 73, a pair of first planetary gears 74, a pair of second planetary gears 75, and a first constant velocity joint 36.

The first ring gear (CL) 71 is, for example, a spur gear with internal teeth 71a whose tooth trace is parallel to the central axis. As described above, the first ring gear 71 is fixed to, for example, an inner peripheral portion of the fourth gear 24 of the power transmission mechanism 13. The central axis of the first ring gear 71 is coaxial with the central axis of the fourth gear 24.

The first carrier (SL) 72 rotatably supports the planetary gears 74 and 75. The central axis of the first carrier 72 is coaxial with the central axis of the first ring gear 71 is parallel to the central axes of the planetary gears 74 and 75. The rotation of the planetary gears 74 and 75 is the rotation centering on the central axes of the planetary gears 74 and 75. The first carrier 72 is connected to, for example, the first constant velocity joint 36.

The first sun gear 73 is, for example, a spur gear with external teeth. The central axis of the first sun gear 73 is coaxial with the central axis of the first carrier 72. The first sun gear 73 engages with the first planetary gears 74.

The pair of first planetary gears 74 and the pair of second planetary gears 75 are, for example, spur gears with external teeth. The central axes of the first planetary gears 74 and the second planetary gears 75 are parallel to the central axis of the first sun gear 73. The first planetary gears 74 engage with the first sun gear 73 and the second planetary gears 75. The second planetary gears 75 engage with the first planetary gears 74 and the internal teeth 71a of the first ring gear 71.

The second differential mechanism 17A according to the modification example includes, for example, a second ring gear 81, a second carrier 82, a second sun gear 83, a pair of third planetary gears 84, a pair of fourth planetary gears 85, a second constant velocity joint 46.

The second ring gear (CR) 81 is, for example, a spur gear with internal teeth 81a whose tooth trace is parallel to its central axis. The central axis of the second ring gear 81 is coaxial with the central axis of the first ring gear 71.

The second carrier (SR) 82 rotatably supports the planetary gears 84 and 85. The central axis of the second carrier 82 is coaxial with the central axis of the second ring gear 81, and is parallel to the central axes of the planetary gears 84 and 85. The rotation of the planetary gears 84 and 85 is the rotation centering on the central axes of the planetary gears 84 and 85. The second carrier 82 is connected to, for example, the second constant velocity joint 46.

The second sun gear 83 is, for example, a spur gear with external teeth. The center axis of the second sun gear 83 is coaxial with the center axis of the second carrier 82. The second sun gear 83 engages with the third planetary gears 84.

The pair of third planetary gears 84 and the pair of fourth planetary gears 85 are, for example, spur gears with external teeth. The central axes of the third planetary gears 84 and the fourth planetary gears 85 are parallel to the central axis of the second sun gear 83. The third planetary gears 84 engage with the second sun gear 83 and the fourth planetary gears 85. The fourth planetary gears 85 engage with the third planetary gears 84 and the internal teeth 81a of the second ring gear 81.

Each of the first differential mechanism 15A and the second differential mechanism 17A according to the modification example includes a center shaft member (Sc) 91 that connects the first sun gear 73 and the second sun gear 83. The central axis of the center shaft member 91 is coaxial with the central axes of the first differential mechanism 15A and the second differential mechanism 17A (that is, the central axes of the first sun gear 73 and the second sun gear 83) according to the modification example.

The switching mechanism 19A according to the modification example includes, for example, a pair of first fixation dogs 61, a pair of second fixation dogs 62, a pair of third fixation dogs 63, a pair of fourth fixation dogs 64, a pair of fifth fixation dogs 65, and a pair of movable dogs 66.

The first fixation dogs 61 are integrally provided in the first casing C1 of the casing C. The second fixation dogs 62 are integrally provided in the first ring gear 71. The third fixation dogs 63 are integrally provided in the center shaft member 91. The fourth fixation dogs 64 are integrally provided in the second ring gear 81. The fifth fixation dogs 65 are integrally provided in the second casing C2 of the casing C.

For example, the fixation dogs 61, 62, 63, 64, and 65 are arranged in the order of the first fixation dog 61, the second fixation dog 62, the third fixation dog 63, the fourth fixation dog 64, and the fifth fixation dog 65. The fixation dogs 61, 62, 63, 64, and 65 are arranged, for example, in a direction parallel to the central axes of the first differential mechanism 15A and the second differential mechanism 17A according to the modification example.

The first ring gear (CL) 71, the first carrier (SL) 72, and the first sun gear 73 of the first differential mechanism 15A according to the modification example are equivalent to the first case (CL) 31, the first side gear (SL) 32, and the second side gear 33 of the first differential mechanism 15 in the embodiment.

The second ring gear (CR) 81, the second carrier (SR) 82, and the second sun gear 83 of the second differential mechanism 17A according to the modification example are equivalent to the second case (CR) 41, the third side gear (SR) 42, and the fourth side gear 43 of the second differential mechanism 17 in the embodiment.

The center shaft member (Sc) 91 according to the modification example is equivalent to the center shaft member (Sc) 51 of the embodiment.

In the embodiment described above, the driving of the movable dogs 66 of the switching mechanism 19 may be controlled by an appropriate control device.

The control device includes a software function unit that functions by executing a predetermined program by a processor such as a central processing unit (CPU). The software function unit is an electronic control unit (ECU) including a processor such as a CPU, a read only memory (ROM) that stores programs, a random access memory (RAM) that temporarily stores data, and an electronic circuit such as a timer. Note that at least a portion of the control device may be an integrated circuit such as a large scale integration (LSI).

While preferred embodiments of the invention have been described and illustrated above, it should be understood that these are exemplary of the invention and are not to be considered as limiting. Additions, omissions, substitutions, and other modifications can be made without departing from the spirit or scope of the present disclosure. Accordingly, the invention is not to be considered as being limited by the foregoing description and is only limited by the scope of the appended claims.

What is claimed is:

1. A drive device comprising:
   a drive source;
   a first differential mechanism including at least a first element operatively connected to a first wheel out of two right and left wheels, a second element operatively connected to the drive source, and a third element;
   a shaft element operatively connected to the third element;
   a second differential mechanism including at least a fourth element operatively connected to the shaft element in common with the third element, a fifth element, and a sixth element operatively connected to a second wheel out of the two right and left wheels;
   a support member supporting the first differential mechanism and the second differential mechanism; and
   a switching mechanism switching the shaft element and the fifth element to a connection state and a non-connection state,
   wherein the switching mechanism has
      a first connection mode in which, via the switching mechanism, the second element, the shaft element, and the fifth element are connected, and in which the first wheel and the second wheel are rotated to be directly connected by prohibiting relative rotations of the first differential mechanism and the second differential mechanism,
      a second connection mode in which, via the switching mechanism, the support member, the second element, and the shaft element are connected, and in which a rotation of the first element is prohibited by fixing the first differential mechanism.

2. The drive device according to claim 1, wherein the switching mechanism switches each part in which the second element, the shaft element, and the fifth element are arranged in this order to a the first connection mode and a non-connection state.

3. The drive device according to claim 1, further comprising:
   wherein the switching mechanism switches the support member and the fifth element to a connection state and a non-connection state.

4. The drive device according to claim 3, wherein the switching mechanism switches the second element, the shaft element, and the fifth element to the first connection mode and a non-connection state.

5. A drive device comprising:
   a drive source;
   a first differential mechanism including at least a first element operatively connected to a first wheel out of two right and left wheels, a second element operatively connected to the drive source, and a third element;
   a shaft element operatively connected to the third element;
   a second differential mechanism including at least a fourth element operatively connected to the shaft element in common with the third element, a fifth element, and a sixth element operatively connected to a second wheel out of the two right and left wheels;
   a support member supporting the first differential mechanism and the second differential mechanism; and
   a switching mechanism switching between a first connection mode in which the second element, the shaft element, and the fifth element are connected and a second connection mode in which the support member, the second element, and the shaft element are connected,
   wherein the switching mechanism switches each part in which the support member, the second element, and the shaft element are arranged in this order to the second connection mode and a non-connection state, and
   wherein the switching mechanism switches the shaft element and the fifth element to a connection state and a non-connection state.

6. A drive device comprising:
   a drive source;
   a first differential mechanism including at least a first element operatively connected to a first wheel out of two right and left wheels, a second element operatively connected to the drive source, and a third element;
a shaft element operatively connected to the third element;
a second differential mechanism including at least a fourth element operatively connected to the shaft element in common with the third element, a fifth element, and a sixth element operatively connected to a second wheel out of the two right and left wheels;
a support member supporting the first differential mechanism and the second differential mechanism; and
a switching mechanism switching between a first connection mode in which the second element, the shaft element, and the fifth element are connected, and a second connection mode in which the support member, the second element, and the shaft element are connected,
wherein the switching mechanism switches each part in which the support member, the second element, and the shaft element are arranged in this order to the second connection mode and a non-connection state, and
wherein the switching mechanism switches the support member and the fifth element to a connection state and a non-connection state.

* * * * *